United States Patent
Choi et al.

(10) Patent No.: US 8,841,035 B2
(45) Date of Patent: Sep. 23, 2014

(54) FLAME RETARDANT ELECTROLYTE SOLUTION FOR RECHARGEABLE LITHIUM BATTERY AND RECHARGEABLE LITHIUM BATTERY INCLUDING THE SAME

(75) Inventors: Nam-Soon Choi, Yongin-si (KR); Irina Profatilova, Yongin-si (KR); Sung-Soo Kim, Yongin-si (KR); Eui-Hwan Song, Yongin-si (KR); Young-Mi Park, Yongin-si (KR)

(73) Assignee: Samsung SDI Co., Ltd., Giheung-gu, Yongin-si, Gyeonggi-do (KR)

(*) Notice: Subject to any disclaimer, the term of this patent is extended or adjusted under 35 U.S.C. 154(b) by 8 days.

(21) Appl. No.: 12/805,854

(22) Filed: Aug. 20, 2010

(65) Prior Publication Data

US 2011/0123869 A1 May 26, 2011

(30) Foreign Application Priority Data

Nov. 20, 2009 (KR) .................. 10-2009-0112854

(51) Int. Cl.
| | |
|---|---|
| *H01M 6/16* | (2006.01) |
| *H01M 10/42* | (2006.01) |
| *H01M 10/0567* | (2010.01) |
| *H01M 10/0568* | (2010.01) |
| *H01M 10/0525* | (2010.01) |
| *H01M 10/0569* | (2010.01) |
| *H01M 4/525* | (2010.01) |
| *H01M 4/587* | (2010.01) |
| *H01M 4/505* | (2010.01) |

(52) U.S. Cl.
CPC ...... *H01M 10/0525* (2013.01); *H01M 10/4235* (2013.01); *H01M 10/0567* (2013.01); *H01M 10/0568* (2013.01); *Y02E 60/122* (2013.01); *H01M 4/525* (2013.01); *H01M 4/587* (2013.01); *H01M 2300/0045* (2013.01); *H01M 4/505* (2013.01); *H01M 10/0569* (2013.01); *H01M 2300/0025* (2013.01)
USPC ........................................... 429/324

(58) Field of Classification Search
USPC ........................................... 429/325
See application file for complete search history.

(56) References Cited

U.S. PATENT DOCUMENTS

| | | | |
|---|---|---|---|
| 2003/0157412 A1* | 8/2003 | Yamaguchi et al. | 429/324 |
| 2005/0164082 A1* | 7/2005 | Kishi et al. | 429/188 |

(Continued)

FOREIGN PATENT DOCUMENTS

| | | |
|---|---|---|
| JP | 2006-164934 | 6/2006 |
| JP | 2007-242420 | 9/2007 |

(Continued)

OTHER PUBLICATIONS

Korean Office Action issued by Korean Patent Office on Jun. 3, 2011 corresponding to Korean Patent Application No. 10-2009-0112854 and Request for Entry of the Accompanying Office Action attached herewith.

(Continued)

*Primary Examiner* — Ula C Ruddock
*Assistant Examiner* — Jacob Marks
(74) *Attorney, Agent, or Firm* — Robert E. Bushnell, Esq.

(57) ABSTRACT

Disclosed are a flame retardant electrolyte solution for a rechargeable lithium battery including a lithium salt, a linear carbonate-based solvent, an ionic liquid including ammonium cations, and a phosphoric acid-based solvent, and a rechargeable lithium battery including the same.

16 Claims, 2 Drawing Sheets

(56) References Cited

U.S. PATENT DOCUMENTS

| | | | |
|---|---|---|---|
| 2005/0277027 A1* | 12/2005 | Kim et al. | 429/326 |
| 2005/0282071 A1* | 12/2005 | Tsuda et al. | 429/331 |
| 2007/0224515 A1* | 9/2007 | Xu et al. | 429/326 |
| 2008/0176141 A1* | 7/2008 | Pan et al. | 429/325 |
| 2008/0241687 A1* | 10/2008 | Ishii et al. | 429/218.1 |
| 2008/0286649 A1* | 11/2008 | Li et al. | 429/188 |
| 2009/0286162 A1* | 11/2009 | Lamanna et al. | 429/307 |
| 2010/0304225 A1* | 12/2010 | Pascaly et al. | 429/342 |

FOREIGN PATENT DOCUMENTS

| | | |
|---|---|---|
| JP | 2008-145433 | 6/2008 |
| JP | 2009-043617 | 2/2009 |
| KR | 10-2007-0083384 | 8/2007 |
| KR | 10-2007-0091938 | 9/2007 |

OTHER PUBLICATIONS

Li et al., Additives for Stabilizing LiPF6-Based Electrolytes Against Thermal Decomposition, J. Electrochem. Soc., 152 (7), A1361-A1365 (2005).

Ota et al., Effect of cyclic phosphate additive in non-flammable electrolyte. J. Power Sources, 119-121 (2003) pp. 393-398.

Achiha, et al., Thermal Stability and Electrochemical Properties of Fluorine Compounds as Nonflammable Solvents for Lithium-Ion Batteries, Journal of The Electrochemical Society, vol. 157, Issue 6, A707-A712, 2002.

Smart, et al., Improved performance of lithium-ion cells with the use of fluorinated carbonate-based electrolytes, Journal of Power Sources, 119-121:359-367, Jun. 1, 2003.

* cited by examiner

FLAME RETARDANT ELECTROLYTE SOLUTION FOR RECHARGEABLE LITHIUM BATTERY AND RECHARGEABLE LITHIUM BATTERY INCLUDING THE SAME

RELATED APPLICATIONS

This application claims priority to and the benefit of Korean Patent Application No. 10-2009-0112854 filed in the Korean Intellectual Property Office on Nov. 20, 2009, the entire contents of which are incorporated herein by reference.

BACKGROUND OF THE INVENTION

1. Field of the Invention

This disclosure relates to a flame retardant electrolyte solution for a rechargeable lithium battery, and a rechargeable lithium battery including the same.

2. Description of the Related Art

Lithium rechargeable batteries have recently drawn attention as a power source for small portable electronic devices. They use an organic electrolyte solution and thereby have twice the discharge voltage of a conventional battery using an alkali aqueous solution, and accordingly have high energy density.

For positive active materials of a rechargeable lithium battery, lithium-transition element composite oxides being capable of intercalating lithium such as $LiCoO_2$, $LiMn_2O_4$, $LiNi_{1-x}Co_xO_2$ ($0<x<1$), and the like have been researched.

As for negative active materials of a rechargeable lithium battery, various carbon-based materials such as artificial graphite, natural graphite, and hard carbon, which can all intercalate and deintercalate lithium ions, have been used.

As for an electrolyte solution, a lithium salt dissolved in a carbonate-based solvent has been generally used. Recently, in order to improve flame retardancy of an electrolyte solution, a mixture of cyclic and linear carbonate solvents including a phosphoric acid-based retardant in an additive amount has been suggested.

However, the phosphoric acid-based retardant causes reductive decomposition in a reaction between a negative electrode and the electrolyte solution to decrease available capacity of the negative electrode and increase cell resistance. Thereby, it suppresses a smooth intercalation reaction of lithium ions.

Furthermore, if the phosphoric acid-based retardant is added in an excessive amount in the form of a solvent instead of in an additive level, the cycle-life characteristics of a battery produced therewith are significantly decreased.

SUMMARY OF THE INVENTION

One aspect of this disclosure provides a flame retardant electrolyte solution for a rechargeable lithium battery that has improved thermal stability, flame retardancy, and high rate and cycle-life characteristics.

Another aspect of this disclosure provides a rechargeable lithium battery including the flame retardant electrolyte solution for a rechargeable lithium battery.

According to one aspect of this disclosure, a flame retardant electrolyte solution for a rechargeable lithium battery is provided that includes a lithium salt, a linear carbonate-based solvent, an ionic liquid including ammonium cations, and a phosphoric acid-based solvent.

The lithium salt includes $LiPF_6$, $LiBF_4$, $LiSbF_6$, $LiAsF_6$, $LiCF_3SO_3$, $LiC_4F_9SO_3$, $LiB(C_6H_5)_4$, $LiClO_4$, $LiAlO_4$, $LiAlCl_4$, $LiN(C_xF_{2x+1}SO_2)(C_yF_{2y+1}SO_2)$ where x and y are natural numbers, LiCl, or LiI, or combinations thereof.

The linear carbonate-based solvent includes one selected from the group consisting of dimethylcarbonate (DMC), diethylcarbonate (DEC), ethylmethylcarbonate (EMC), and combinations thereof, and has a viscosity ranging from 0.4 to 1 cP.

The ammonium cations include N-included heterocyclic cations of pyridinium, pyridazinium, pyrimidinium, pyrazinium, imidazolium, pyrazolium, thiazolium, oxazolium, or triazolium, or combinations thereof, or cations represented by the following Chemical Formulae 1 to 3. The ionic liquid further includes $N(SO_2CH_3)_2^-$, $N(SO_2CF_2CF_3)_2^-$, $PF_6^-$, $BF_4^-$, or anions represented by the following Chemical Formula 4 or 5. The ionic liquid including ammonium cations is included in an amount of about 20 to about 70 wt % based on the total weight of the flame retardant electrolyte solution for a rechargeable lithium battery.

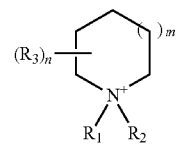

Chemical Formula 1

In the above Chemical Formula 1, $R_1$ and $R_2$ are independently a substituted or unsubstituted alkyl or a substituted or unsubstituted alkoxy, $R_3$ is hydrogen or a substituted or unsubstituted alkyl, n is an integer of 1 to 5, when n is 2 or more the respective $R_3$'s are the same or different from each other, and m is 0 or 1.

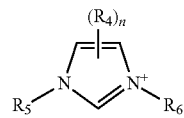

Chemical Formula 2

In the above Chemical Formula 2, $R_5$ and $R_6$ are independently a substituted or unsubstituted alkyl or a substituted or unsubstituted alkoxy, and $R_4$ is hydrogen or a substituted or unsubstituted alkyl, n is an integer of 1 to 3, and when n is 2 or more the respective $R_4$'s are the same or different from each other.

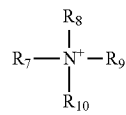

Chemical Formula 3

In the above Chemical Formula 3, $R_7$, $R_8$, $R_9$, and $R_{10}$ are independently a substituted or unsubstituted alkyl or a substituted or unsubstituted alkoxy.

Chemical Formula 4

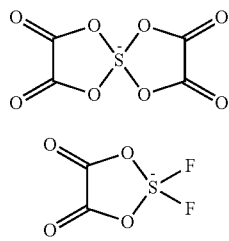

Chemical Formula 5

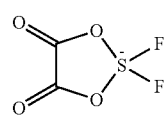

The phosphoric acid-based solvent may include a phosphate compound, a phosphonate compound, or a phosphazene compound, or combinations thereof. The phosphoric acid-based solvent is included in an amount of about 5 wt % to about 30 wt % based on the total weight of the flame retardant electrolyte solution for a rechargeable lithium battery.

The flame retardant electrolyte solution for a rechargeable lithium battery may further include a fluorine-substituted carbonate-based solvent. The fluorine-substituted carbonate-based solvent includes fluoroethylene carbonate, difluoroethylene carbonate, fluorodimethyl carbonate, or fluoroethylmethyl carbonate, or combinations thereof. The fluorine-substituted carbonate-based solvent is included in an amount of about 5 to about 80 parts based on 100 parts by weight of the flame retardant electrolyte solution for a rechargeable lithium battery.

The flame retardant electrolyte solution for a rechargeable lithium battery has a viscosity of about 1 to about 5 cP.

According to another aspect of this disclosure, a rechargeable lithium battery is provided that includes a positive electrode, a negative electrode, and the flame retardant electrolyte solution.

Hereinafter, further embodiments of this disclosure will be described in detail.

The rechargeable lithium battery according to one embodiment has improved thermal stability, flame retardancy, and electrochemical characteristics such as high rate and cycle-life properties, by reducing or eliminating decomposition of battery electrolyte solutions at a high temperature.

DETAILED DESCRIPTION

Figure 1:
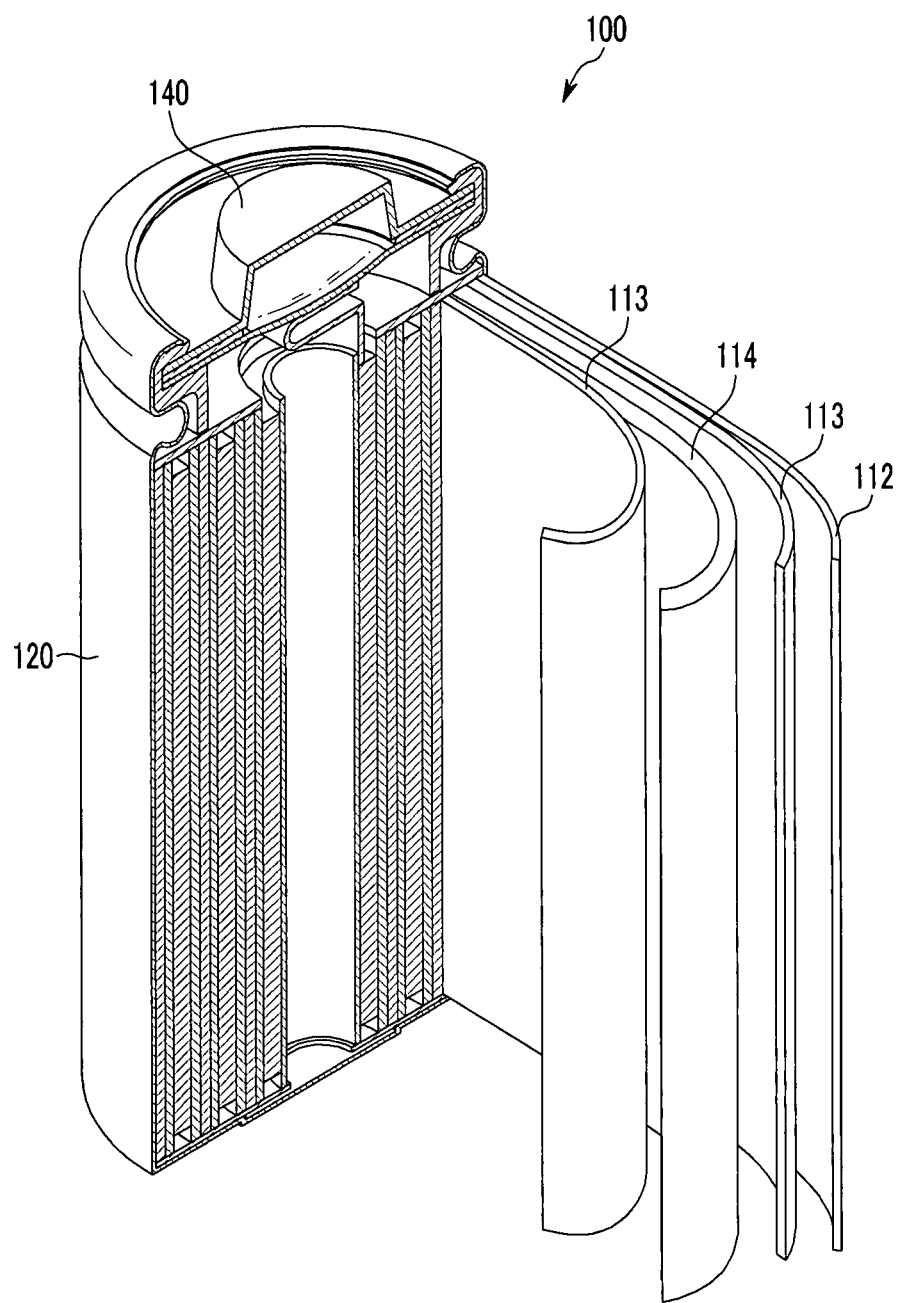
FIG. 1 is a schematic view of a representative structure of a rechargeable lithium battery.

Exemplary embodiments will hereinafter be described in detail. However, these embodiments are exemplary, and this disclosure is not limited thereto.

As used herein, when specific definition is not provided, the terms "alkyl" and "alkoxy" respectively refer to a C1 to C30 alkyl and a C1 to C30 alkoxy.

The term "substituted" refers to one substituted with one of a C1 to C30 alkoxy or a C1 to C30 carboxyl.

The flame retardant electrolyte solution for a rechargeable lithium battery according to one embodiment includes a lithium salt, a linear carbonate-based solvent, an ionic liquid including ammonium cations, and a phosphoric acid-based solvent.

The lithium salt is dissolved in the non-aqueous organic solvent to supply lithium ions in the battery. It may perform a basic operation of a rechargeable lithium battery, and facilitates transport of lithium ions between positive and negative electrodes.

Non-limiting examples of the lithium salt include one of $LiPF_6$, $LiBF_4$, $LiSbF_6$, $LiAsF_6$, $LiCF_3SO_3$, $LiC_4F_9SO_3$, $LiB(C_6H_5)_4$, $LiClO_4$, $LiAlO_4$, $LiAlCl_4$, $LiN(C_xF_{2x+1}SO_2)(C_yF_{2y+1}SO_2)$ where x and y are natural numbers, LiCl, or LiI, or a combination thereof.

The lithium salt may be used in a 0.1 to 2.0M concentration. Within the above range, lithium ion conductivity and electrolyte performance are improved due to optimal viscosity.

The lithium salt may be included in an amount of about 2 to about 30 wt %, and in one embodiment, it may be included in an amount of about 5 to about 20 wt % based on the total weight of the flame retardant electrolyte solution. Within the above ranges, optimal ion conductivity of the flame retardant electrolyte solution may be obtained.

An electrolyte solution for a rechargeable lithium battery usually includes mixed linear and cyclic carbonate-based solvents, but in one embodiment, a linear carbonate-based solvent is singularly included in the electrolyte solution.

In order to ensure a dissociation degree of a lithium salt and mobility of dissociated lithium ions, a mixed solvent of a cyclic carbonate-based solvent such as ethylene carbonate and a linear carbonate-based solvent is generally used. However, the mixed solvent may produce gases at a high temperature, and lithium salts of a is passivation film may be dissolved. In the electrolyte solution according to one embodiment, such a cyclic carbonate-based solvent is not needed, and thus gas generation and collapse of a passivation film at a high temperature are solved resulting in improvement in high rate and cycle-life characteristics at room temperature.

In one embodiment, the linear carbonate-based solvent includes dimethyl carbonate (DMC), diethyl carbonate (DEC), or ethylmethyl carbonate (EMC), or mixtures thereof.

The linear carbonate-based solvent has a viscosity of about 0.4 to about 1 cP (mPa·s). When the linear carbonate-based solvent has a viscosity within the range, high rate and cycle-life characteristics are improved.

The linear carbonate-based solvent may be included in an amount of 1 to 90 wt % based on the total weight of the flame retardant electrolyte solution, in one embodiment it may be included in an amount of about 30 to about 80 wt %, and in another embodiment it may be included in an amount of about 40 to about 60 wt %. When the linear carbonate-based solvent is included in an above amount, viscosity increase of the flame retardant electrolyte solution is minimized and the electrolyte has flame retardancy.

For the ionic liquid including ammonium cations according to one embodiment, the term "ionic liquid" refers to a liquid consisting of ions. The ionic liquid is present in a liquid state at 100° C. or less. Particularly, an ionic liquid that is present as a liquid at room temperature is referred to as a room temperature melted salt (room temperature ionic liquid).

The ammonium cations include N-included heterocyclic cations of pyridinium, pyridazinium, pyrimidinium, pyrazinium, imidazolium, pyrazolium, thiazolium, oxazolium, or triazolium, or combinations thereof.

Alternatively, the ammonium cations may be one of cations represented by the following Chemical Formulae 1 to 3.

Chemical Formula 1

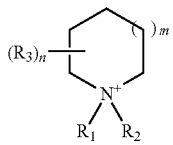

In the above Chemical Formula 1, $R_1$ and $R_2$ are independently a substituted or unsubstituted alkyl or a substituted or unsubstituted alkoxy, $R_3$ is hydrogen or a substituted or unsubstituted alkyl, n is an integer of 1 to 5, when n is 2 or more the respective $R_3$'s are the same or different from each other, and m is 0 or 1.

Chemical Formula 2

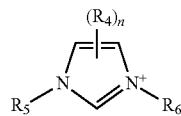

In the above Chemical Formula 2, $R_5$ and $R_6$ are independently a substituted or unsubstituted alkyl or a substituted or unsubstituted alkoxy, $R_4$ is hydrogen or a substituted or unsubstituted alkyl, n is an integer of 1 to 3, and when n is 2 or more the respective $R_4$'s are the same or different from each other.

Chemical Formula 3

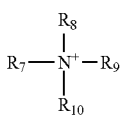

In the above Chemical Formula 3, $R_7$, $R_8$, $R_9$, and $R_{10}$ are independently a substituted or unsubstituted alkyl or a substituted or unsubstituted alkoxy.

The ionic liquid further includes $N(SO_2CH_3)_2^-$, $N(SO_2CF_2CF_3)_2^-$, $PF_6^-$, $BF_4^-$, or anions represented by the following Chemical Formula 4 or 5.

Chemical Formula 4

Chemical Formula 5

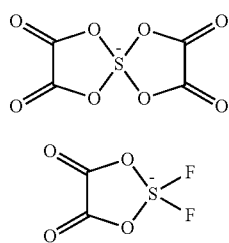

The ionic liquid including ammonium cations has low volatility and thus inhibits battery internal pressure caused by gases from solvent volatilization and swelling of a battery.

The ionic liquid including ammonium cations may be included in an amount of about 1 to about 90 wt %, and in one embodiment, it is included in an amount of about 20 to about 70 wt % based on the total weight of the flame retardant electrolyte solution. When the ionic liquid including ammonium cations is included within the above range, flame retardancy of an electrolyte solution is maximized.

The phosphoric acid-based solvent includes a phosphate compound, a phosphonate compound, or a phosphazene compound, or a combination thereof.

Non-limiting examples of the phosphate compound include trimethyl phosphate (TMP), triethyl phosphate (TEP), tripropyl phosphate (TPP), triphenyl phosphate (TPP), tricresyl phosphate (TCP), trixylene phosphate (TXP), and the like.

Non-limiting examples of the phosphonate compound include an alkyl phosphonate compound such as dimethyl methylphosphonate (DMMP) and diethyl methylphosphonate (DEMP).

Non-limiting examples of the phosphazene compound include hexamethoxycyclotriphosphazene, fluorinated cyclotriphosphazene, and the like.

The phosphate, phosphonate, and phosphazene compounds may have a halogen substituent instead of hydrogen.

The phosphoric acid-based solvent selectively reacts with radicals such as R., H., and the like to prevent a combustion reaction of an electrolyte solution. Accordingly, a combustion decomposition reaction of an electrolyte solution caused by heat generated inside a battery may be suppressed.

The phosphoric acid-based solvent has a dielectric constant of 3 to 20.

When the phosphoric acid-based solvent has the above-ranged dielectric constant, ion-dipole interactions between oxygen having lone-pair electrons and lithium ions occur to enable dissociation of lithium salts.

The phosphoric acid-based solvent is included in an amount of about 1 to about 90 wt %, and in one embodiment, is included in an amount of about 5 to about 30 wt % based on the total weight of the flame retardant electrolyte solution. When the is phosphoric acid-based solvent is included within the range, flame retardancy or a self-extinguishing property of an electrolyte solution is obtained.

The flame retardant electrolyte solution according to one embodiment may further include a fluorine-substituted carbonate-based solvent.

The fluorine-substituted carbonate-based solvent includes fluoroethylene carbonate, difluoroethylene carbonate, fluorodimethyl carbonate, fluoroethylmethyl carbonate, and mixtures thereof.

The fluorine-substituted carbonate-based solvent has HOMO (highest occupied molecular orbital) energy of about −12 eV or more, and LUMO (lowest unoccupied molecular orbital) energy of about −0.5 to about −1 eV.

In addition, it is reductively decomposed in the region of about 0.7 V (vs. $Li/Li^+$) or more and oxidatively decomposed in the region of about 5 V (vs. $Li/Li^+$) or more during the initial charge.

The fluorine-substituted carbonate-based solvent can form a preferable structured coating while the viscosity is not increased when adding it to the electrolyte solution, so as to effectively avoid an exothermal reaction between the charged electrode active material and the electrolyte solution.

In addition, the fluorine-substituted carbonate-based solvent can provide electrochemical stability of a phosphoric acid-based solvent and ionic liquid including ammonium cations. In other words, since the fluorine-substituted carbonate-based solvent having low LUMO energy is decomposed before the phosphoric acid-based solvent and the ionic liquid including ammonium cations are reductively decomposed at the interface between the negative electrode and the organic electrolyte solution to provide a stable negative electrode coating, it is possible to maximize the reversible efficiency, the capacity availability, and the long cycle-life characteristic of a battery.

In addition, the fluorine-substituted carbonate-based solvent can provide a solid electrolyte solution interface (SEI) passivation film that has excellent oxidation resistance and is stable for the negative electrode surface. Thereby, according to one embodiment, it is not required to include a non-fluorinated cyclic carbonate-based solvent.

The fluorine-substituted carbonate-based solvent is added at about 5 to about 80 parts by weight, and in one embodiment, it is added at about 10 to about 50 parts by weight based on 100 parts by weight of the flame retardant electrolyte solution. When the fluorine-substituted carbonate-based solvent is added within the range, it is possible to provide an SEI passivation film that is stable for the negative electrode surface and to minimize the amount of fluorinated carbonate-based solvent remaining in the electrolyte solution without forming the coating. Thereby, it can solve the problem of increasing the inner cell pressure.

According to one embodiment, the flame retardant electrolyte solution has a viscosity of about 5 cP or less, and in another embodiment, it ranges from about 1 to about 3 cP. When the viscosity of flame retardant electrolyte solution is within these ranges, it is possible to suppress increasing the viscosity of the flame retardant electrolyte solution and to improve the high-rate charge and discharge characteristic of a battery.

According to one embodiment, the flame retardant electrolyte solution can improve electrochemical characteristics such as thermal stability, flame retardancy, the high rate characteristic, and the cycle-life retention characteristic by including the lithium salt, linear carbonate-based solvent, ionic liquid including ammonium cations, phosphoric acid-based solvent, and fluorine-substituted carbonate-based solvent, so as to minimize or avoid the thermo-decomposition characteristic of a battery constituting elements at a high temperature.

According to another embodiment, a rechargeable lithium battery including the flame retardant electrolyte solution is provided.

Rechargeable lithium batteries may be classified as lithium ion batteries, lithium ion polymer batteries, and lithium polymer batteries according to the presence of a separator and the kind of electrolyte used in the battery. The rechargeable lithium batteries may have a variety of shapes and sizes, and include cylindrical, prismatic, or coin-type batteries, and may be thin film batteries or may be rather bulky in size. Structures and fabricating methods for lithium ion batteries are well known in the art.

FIG. 1 is a schematic view of a representative structure of a rechargeable lithium battery. FIG. 1 illustrates a rechargeable lithium battery 100, which includes a negative electrode 112, a positive electrode 114, a separator 113 interposed between the negative electrode 112 and the positive electrode 114, a flame retardant electrolyte solution (not shown) impregnating the negative electrode 112, positive electrode 114, and separator 113, a battery case 120, and a sealing member 140 sealing the battery case 120. The negative electrode 112, positive electrode 114, and separator 113 are sequentially stacked, spirally wound, and placed in a battery case 120 to fabricate such a rechargeable lithium battery 100.

The positive electrode 114 includes a current collector and a positive active material layer disposed on the current collector.

The positive active material includes lithiated intercalation compounds that reversibly intercalate and deintercalate lithium ions. The positive active material may include a composite oxide including at least one selected from the group consisting of cobalt, manganese, and nickel, as well as lithium. In particular, the following lithium-containing compounds may be used:

$Li_aA_{1-b}B_bD_2$ (wherein $0.90 \le a \le 1.8$ and $0 \le b \le 0.5$); $Li_aE_{1-b}B_bO_{2-c}D_c$ (wherein $0.90 \le a \le 1.8$, $0 \le b \le 0.5$, and $0 \le c \le 0.05$); $LiE_{2-b}B_bO_{4-c}D_c$ (wherein $0 \le b \le 0.5$ and $0 \le c \le 0.05$); $Li_aNi_{1-b-c}Co_bB_cD_\alpha$ (wherein $0.90 \le a \le 1.8$, $0 \le b \le 0.5$, $0 \le c \le 0.05$, and $0 < \alpha \le 2$); $Li_aNi_{1-b-c}Co_bB_cO_{2-\alpha}F_\alpha$ (wherein $0.90 \le a \le 1.8$, $0 \le b \le 0.5$, $0 \le c \le 0.05$, and $0 < \alpha < 2$); $Li_aNi_{1-b-c}Co_bB_cO_{2-\alpha}F_2$ (wherein $0.90 \le a \le 1.8$, $0 \le b \le 0.5$, $0 \le c \le 0.05$, and $0 < \alpha < 2$); $Li_aNi_{1-b-c}Mn_bB_cD_\alpha$ (wherein $0.90 \le a \le 1.8$, $0 \le b \le 0.5$, $0 \le c \le 0.05$, and $0 < \alpha \le 2$); $Li_aNi_{1-b-c}Mn_bB_cO_{2-\alpha}F_\alpha$ (wherein $0.90 \le a \le 1.8$, $0 \le b \le 0.5$, $0 \le c \le 0.05$, and $0 < \alpha < 2$); $Li_aNi_{1-b-c}Mn_bB_cO_{2-\alpha}F_2$ (wherein $0.90 \le a \le 1.8$, $0 \le b \le 0.5$, $0 \le c \le 0.05$, and $0 < \alpha < 2$); $Li_aNi_bE_cG_dO_2$ (wherein $0.90 \le a \le 1.8$, $0 \le b \le 0.9$, $0 \le c \le 0.5$, and $0.001 \le d \le 0.1$); $Li_aNi_bCo_cMn_dG_eO_2$ (wherein $0.90 \le a \le 1.8$, $0 \le b \le 0.9$, $0 \le c \le 0.5$, $0 \le d \le 0.5$, and $0.001 \le e \le 0.1$); $Li_aNiG_bO_2$ (wherein $0.90 \le a \le 1.8$ and $0.001 \le b \le 0.1$); $Li_aCoG_bO_2$ (wherein $0.90 \le a \le 1.8$ and $0.001 \le b \le 0.1$); $Li_aMnG_bO_2$ (wherein $0.90 \le a \le 1.8$ and $0.001 \le b \le 0.1$); $Li_aMn_2G_bO_4$ (wherein $0.90 \le a \le 1.8$ and $0.001 \le b \le 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ ($0 \le f \le 2$); $Li_{(3-f)}Fe_2(PO_4)_3$ ($0 \le f \le 2$); and $LiFePO_4$.

In the above formulae, A is Ni, Co, Mn, or combinations thereof; B is Al, Ni, Co, Mn, Cr, Fe, Mg, Sr, V, a rare earth element, or combinations thereof; D is O, F, S, P, or combinations thereof; E is Co, Mn, or combinations thereof; F is F, S, P, or combinations thereof; G is Al, Cr, Mn, Fe, Mg, La, Ce, Sr, V, or combinations thereof; Q is Ti, Mo, Mn, or combinations thereof; I is Cr, V, Fe, Sc, Y, or combinations thereof; to and J is V, Cr, Mn, Co, Ni, Cu, or combinations thereof.

The compound can have a coating layer on the surface, or can be mixed with a compound having a coating layer. The coating layer may include at least one coating element compound selected from the group consisting of an oxide of a coating element, a hydroxide, an oxyhydroxide of a coating element, an oxycarbonate of a is coating element, and a hydroxylcarbonate of a coating element. The compounds for a coating layer can be amorphous or crystalline. The coating element for a coating layer may include Mg, Al, Co, K, Na, Ca, Si, Ti, V, Sn, Ge, Ga, B, As, Zr, or mixtures thereof. The coating layer can be formed in a method having no negative influence on properties of a positive active material by including these elements in the compound. For example, the method may include any coating method such as spray coating, dipping, and the like, but is not illustrated in more detail, since such methods are well-known to those who work in the art.

Any electrically conductive material may be used as a conductive material unless it causes a chemical change. Examples of the conductive material include natural graphite, artificial graphite, carbon black, acetylene black, ketjen black, a carbon fiber, a metal powder or a metal fiber including copper, nickel, aluminum, silver, and so on, and a polyphenylene derivative.

The binder improves binding properties of the positive active material particles to each other and to a current collector. Examples of the binder include at least one selected from the group consisting of polyvinyl alcohol, carboxylmethyl cellulose, hydroxypropyl cellulose, diacetyl cellulose, polyvinylchloride, carboxylated polyvinyl chloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The current collector may be Al, but is not limited thereto.

The negative electrode 112 includes a current collector and a negative active material layer disposed on the current collector, and the negative active material layer includes a negative active material.

The negative active material includes a material that reversibly intercalates/deintercalates lithium ions, a lithium metal, a lithium metal alloy, a material being capable of doping lithium, or a transition metal oxide.

The material that reversibly intercalates/deintercalates lithium ions includes carbon materials. The carbon material may be any generally-used carbon-based negative active material in a lithium ion rechargeable battery. Examples of the carbon material include crystalline carbon, amorphous carbon, and a mixture thereof. The crystalline carbon may be non-shaped, or sheet, flake, spherical, or fiber shaped natural graphite or artificial graphite. The amorphous carbon may be a soft carbon (carbon obtained by sintering at a low temperature), a hard carbon (carbon obtained by sintering at a high temperature), mesophase pitch carbide, fired coke, and so on.

Examples of the lithium metal alloy include lithium and a metal of Na, K, Rb, Cs, Fr, Be, Mg, Ca, Sr, Si, Sb, Pb, In, Zn, Ba, Ra, Ge, Al, or Sn.

Examples of the material being capable of doping lithium include Si, $SiO_x$ (0<x<2), a Si—Y alloy (where Y is an element selected from the group consisting of an alkali metal, an alkaline-earth metal, a group 13 element, a group 14 element, a transition element, a rare earth element, and combinations thereof, and is not Si), Sn, $SnO_2$, Sn—Y (where Y is an element selected from the group consisting of an alkali metal, an alkaline-earth metal, a group 13 element, a, group 14 element, a transition element, a rare earth element, and combinations thereof, and is not Sn), or mixtures to thereof. At least one of these materials may be mixed with $SiO_2$. The element Y may it include Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or combinations thereof.

Examples of the transition metal oxide include vanadium oxide, lithium vanadium oxide, and the like.

The negative active material layer includes a binder, and optionally a conductive material.

The binder improves binding properties of the negative active material particles to each other and to a current collector. Examples of the binder include at least one selected from the group consisting of polyvinyl alcohol, carboxylmethyl cellulose, hydroxypropyl cellulose, polyvinyl chloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

Any electrically conductive material may be used as a conductive material unless it causes a chemical change. Examples of the conductive material include natural graphite, artificial graphite, carbon black, acetylene black, ketjen black, a carbon fiber, a metal powder or a metal fiber including copper, nickel, aluminum, silver, and so on, and a polyphenylene derivative.

The current collector may include a copper foil, a nickel foil, a stainless steel foil, a titanium foil, a nickel foam, a copper foam, a polymer substrate coated with a conductive metal, or combinations thereof.

The negative electrode 112 and positive electrode 114 may be fabricated by a method including mixing the active material, a conductive material, and a binder to provide an active material composition, and coating the composition on a current collector. Electrode manufacturing methods are well known, and thus are not described in detail in the present specification. The solvent can be N-methylpyrrolidone, but it is not limited thereto.

The rechargeable lithium battery 100 includes the above flame retardant electrolyte solution according to one embodiment.

The rechargeable lithium battery 100 may further include the separator 113 between the positive electrode and the negative electrode, as needed. The separator may include any material used in conventional lithium secondary batteries. Non-limiting examples of suitable separator materials include polyethylene, polypropylene, polyvinylidene fluoride, and multi-layers thereof such as a polyethylene/polypropylene double-layered separator, a polyethylene/polypropylene/polyethylene three-layered separator, and a polypropylene/polyethylene/polypropylene three-layered separator.

The following examples illustrate this disclosure in more detail. These examples, however, are not in any sense to be interpreted as limiting the scope of this disclosure.

Preparation of Flame Retardant Electrolyte Solution

EXAMPLE 1

A flame retardant electrolyte solution was prepared with 10 wt % of $LiPF_6$ (1M concentration), 50 wt % of dimethyl carbonate (DMC), 20 wt % of an ionic liquid including ammonium cations represented by the following Chemical Formula 6, 10 wt % of trimethyl phosphate (TMP), and 10 wt % of fluoroethylene carbonate (FEC) 10 wt %.

Chemical Formula 6

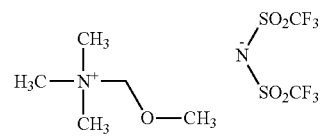

COMPARATIVE EXAMPLE 1

A flame retardant electrolyte solution was prepared in accordance with the same procedure as in Example 1, except that 10 wt % of $LiPF_6$ (1M concentration), 60 wt % of ethylene carbonate (EC) and dimethyl carbonate (DMC) mixed in a weight ratio of 3:7, and 30 wt % of an ionic liquid including ammonium cations represented by the above Chemical Formula 6 were used.

COMPARATIVE EXAMPLE 2

A flame retardant electrolyte solution was prepared in accordance with the same procedure as in Example 1, except that 10 wt % of $LiPF_6$ (1M concentration), 60 wt % of ethylene carbonate (EC) and dimethyl carbonate (DMC) mixed in a weight ratio of 3:7, and 30 wt % of trimethyl phosphate (TMP) were used.

COMPARATIVE EXAMPLE 3

A flame retardant electrolyte solution was prepared with the same procedure as in Example 1, except that 10 wt % of LiPF$_6$ (1M concentration) and 90 wt % of ethylene carbonate (EC) and dimethyl carbonate (DMC) mixed at a weight ratio of 3:7 were used.

COMPARATIVE EXAMPLE 4

A flame retardant electrolyte solution was prepared with the same procedure as in Example 1, except that the carbonate-based solvent was a mixture of ethylene carbonate (EC) and dimethyl carbonate (DMC) at a weight ratio of 3:7, instead of the dimethyl carbonate (DMC) single solvent.

EXPERIMENTAL EXAMPLE 1

Measuring Viscosity of Flame Retardant Electrolyte to Solution

Each flame retardant electrolyte solution obtained from Example 1 and Comparative Examples 1 to 4 was measured to determine the viscosity as in the following process, and the results are shown in the following Table 1.

The viscosity of each flame retardant electrolyte solution was measured with a rotary viscometer (digital) by monitoring a stress change depending upon frequency, and the viscosity was evaluated.

EXPERIMENTAL EXAMPLE 2

Measuring Flame Retardancy of Flame Retardant Electrolyte Solution

Each flame retardant electrolyte solution obtained from Example 1 and Comparative Examples 1 to 4 was measured to determine the flame retardancy as in the following process, and the results are shown in the following Table 1.

The retardancy of each flame retardant electrolyte solution was measured by the standard method of the UL 94 flammability test in order to determine the combustion degree through the flame combustion test. The flammability test was carried out by supporting 4 cm×1 cm glass fiber with 0.5 g of electrolyte solution, contacting one end thereof with a flame source, and observing whether it caught fire or not and the duration for catching fire to determine the retardancy of the flame retardant electrolyte solution.

TABLE 1

|  | Ex. 1 | Comp. Ex. 1 | Comp. Ex. 2 | Comp. Ex. 3 | Comp. Ex. 4 |
| --- | --- | --- | --- | --- | --- |
| Viscosity (cP) | 4.7 | 3.2 | 3.4 | 10.3 | 5.6 |
| Flame retardancy | Non-flammable | Very flammable | Self extinguishing | Nonflammable | Nonflammable |

As shown in Table 1, the flame retardant electrolyte solution according to Example 1 had a viscosity of 5 cP or less and showed excellent retardancy.

On the other hand, the flame retardant electrolyte solution according to Comparative Example 1 including a lithium salt, a cyclic and linear carbonate-based mixed solvent, and an ionic liquid including ammonium cations, and the flame retardant electrolyte solution according to Comparative Example 2 including a lithium salt, a cyclic and linear carbonate-based mixed solvent, and a phosphoric acid-based solvent each had a viscosity of 5 cP or less, but flame retardancy was deteriorated. In addition, the flame retardant electrolyte solution according to Comparative Example 3 and the flame retardant electrolyte solution according to Comparative Example 4 prepared in accordance with the same procedure as in Example 1 except including a cyclic and linear carbonate-based mixed solvent each had excellent flame retardancy, but each viscosity was out of the appropriate range of this disclosure.

Fabricating Rechargeable Lithium Cell

A rechargeable lithium cell was fabricated with each flame retardant electrolyte solution obtained from Example 1 and Comparative Examples 1 to 4, and the method thereof was as follows.

97 wt % of an artificial graphite negative active material and 3 wt % of a polyvinylidene fluoride binder were mixed to provide a mixture, and the mixture was dispersed in N-methyl-2-pyrrolidone to provide a negative active material slurry. The negative active material slurry was uniformly coated on a 20 μm-thick copper foil and dried to provide a negative electrode. Li metal was used as a counter electrode for the to negative electrode. With the obtained negative electrode, the counter electrode, and the electrolyte solution, a half-cell was fabricated in accordance with the general method.

EXPERIMENTAL EXAMPLE 3

Measuring Flame Retardancy of Fully Charged Negative Electrode

The negative electrode including each flame retardant electrolyte solution obtained from Example 1 and Comparative Examples 1 to 4 was fully charged at a 0.1 C condition to 10 mV with respect to the lithium electrode and the retardancy was measured in accordance with the following process, and the results are shown in the following Table 2.

The fully charged negative electrode including the flame retardant electrolyte solution was directly contacted with a flame source, and whether it caught fire or not and the duration for catching fire were observed to determine the retardancy of the fully charged negative electrode.

EXPERIMENTAL EXAMPLE 4

Measuring Charge and Discharge Characteristic of Lithium Rechargeable Cell

Each rechargeable lithium cell obtained from Example 1 and Comparative Examples 1 to 3 was measured to determine the electrochemical charge and discharge characteristic in accordance with the following process, and the results are shown in the following Table 2.

Each rechargeable lithium cell obtained from Example 1 and Comparative Examples 1 to 3 was charged and discharged once at 0.1 C to determine the electrochemical charge and discharge characteristic. The formation efficiency was calculated as:

$$\text{Formation efficiency} = \frac{\text{discharge capacity at the first cycle}}{\text{charge capacity at the first cycle}} \times 100.$$

In addition, each rechargeable lithium cell according to Example 1 and Comparative Examples 4 was charged and discharged at a 1 C rate and a 2 C rate and the capacity retention was measured, and the results are shown in the following Table 3.

EXPERIMENTAL EXAMPLE 5

Analyzing DSC Graph of Fully Charged Negative Electrode

Figure 2:
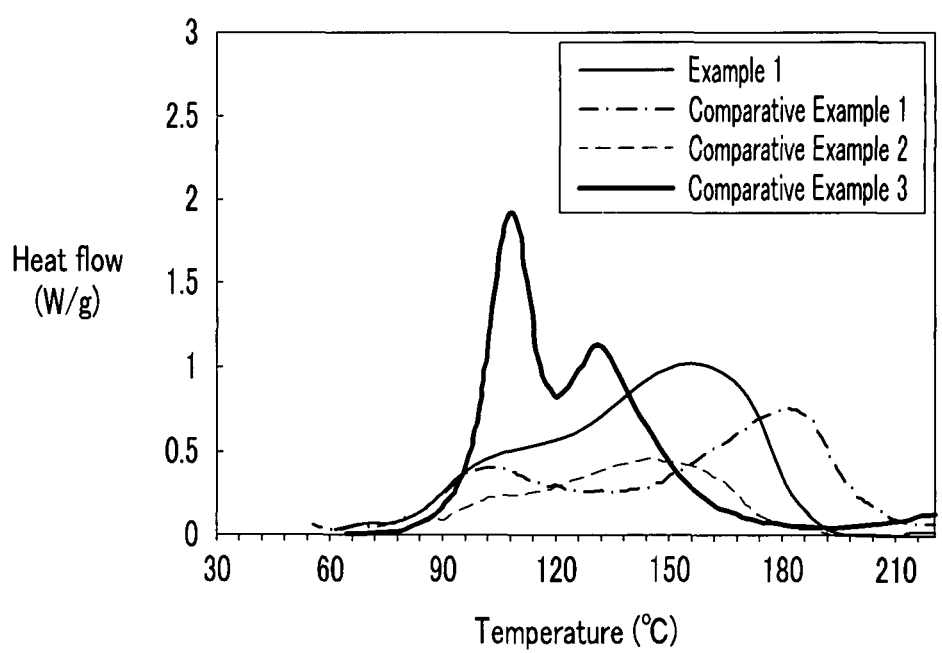
FIG. 2 is a graph showing differential scanning calorimetry (DSC) of fully charged negative electrodes according to Example 1 and Comparative Examples 1 to 3.

FIG. 2 shows a differential scanning calorimetry (DSC) graph of the fully charged negative electrode obtained from Example 1 and Comparative Examples 1 to 3. Referring to FIG. 2, the temperature initiating thermo-decomposition was 70° C. in Example 1, 64° C. in Comparative Example 1, 80° C. in Comparative Example 2, and 75° C. in Comparative Example 3. In addition, the exothermic heat was evaluated from the corresponding area of each graph. The exothermic heat was 210 J/g in Example 1, 280 J/g in Comparative Example 1, 210 J/g in Comparative Example 2, and 350 J/g in Comparative Example 3. From the results, the rechargeable lithium cell according to Example 1 had low exothermic heat, showing an improvement in thermal stability.

TABLE 2

|  | Ex. 1 | Comp. Ex. 1 | Comp. Ex. 2 | Comp. Ex. 3 |
|---|---|---|---|---|
| Retardancy of fully charged negative electrode | Very good | Severely bad | Good | Bad |
| Charge capacity (mAh/g) | 361 | 377 | 385 | 416 |
| Discharge capacity (mAh/g) | 335 | 351 | 350 | 328 |
| Formation efficiency (%) | 93 | 93 | 91 | 79 |

TABLE 3

|  | Example 1 | Comparative Example 4 |
|---|---|---|
| Capacity retention (1 C rate) (%) | 95.6 | 93.2 |
| Capacity retention (2 C rate) (%) | 90.1 | 88.8 |

As shown in Table 2, the rechargeable lithium cell according to Example 1 had excellent flame retardancy of a fully charged negative electrode, and also had excellent formation efficiency.

On the other hand, in the case of the rechargeable lithium cell according to Comparative Example 1 including a lithium salt, a cyclic and linear carbonate-based mixed solvent, and an ionic liquid including ammonium cations; the rechargeable lithium cell according to Comparative Example 2 including a lithium salt, a cyclic and linear carbonate-based mixed solvent, and a phosphoric acid-based solvent; and the rechargeable lithium cell according to Comparative Example 3 including a lithium salt and a cyclic and linear carbonate-based mixed solvent, the flame retardancy of the fully charged negative electrodes or the formation efficiency were deteriorated.

In addition, as shown in Table 3, the lithium rechargeable cell according to Example 1 including a linear carbonate-based single solvent had higher capacity retention than that of Comparative Example 4 including a cyclic and linear carbonate-based mixed solvent.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A flame retardant electrolyte solution for a rechargeable lithium battery consisting essentially of:
   a lithium salt;
   a carbonate-based solvent consisting of at least one linear carbonate-based solvent;
   a fluorine-substituted carbonate-based solvent comprising at least one of a cyclic fluorine-substituted carbonate-based solvent and a linear fluorine-substituted carbonate-based solvent;
   an ionic liquid including ammonium cations; and
   a phosphazene solvent, the phosphazene solvent comprising a phosphazene compound,
   the phosphazene solvent being included in an amount of about 5 wt % to about 30 wt % based on the total weight of the flame retardant electrolyte solution for a rechargeable lithium battery.

2. The flame retardant electrolyte solution of claim 1, the lithium salt comprising one of $LiPF_6$, $LiBF_4$, $LiSbF_6$, $LiAsF_6$, $LiCF_3SO_3$, $LiC_4F_9SO_3$, $LiB(C_6H_5)_4$, $LiClO_4$, $LiAlO_4$, $LiAlCl_4$, $LiN(C_xF_{2x+1}SO_2)(C_yF_{2y+1}SO_2)$ where x and y are natural numbers, LiCl, LiI and combinations thereof.

3. The flame retardant electrolyte solution of claim 1, the at least one linear carbonate-based solvent comprising at least one selected from the group consisting of dimethylcarbonate (DMC), diethylcarbonate (DEC), ethylmethylcarbonate (EMC) and combinations thereof.

4. The flame retardant electrolyte solution of claim 1, the at least one linear carbonate-based solvent has viscosity of about 0.4 cP to about 1 cP.

5. The flame retardant electrolyte solution of claim 1, the ammonium cations comprising one of N-included heterocyclic cations of pyridinium, pyridazinium, pyrimidinium, pyrazinium, imidazolium, pyrazolium, thiazolium, oxazolium, triazolium and combinations thereof.

6. The flame retardant electrolyte solution of claim 1, the ammonium cations comprising one or more cations represented by any one of the following Chemical Formulae 1 to 3:

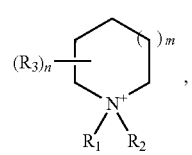

Chemical Formula 1

$R_1$ and $R_2$ in Chemical Formula 1 being independently one of a substituted or unsubstituted alkyl and a substituted or unsubstituted alkoxy, $R_3$ in Chemical Formula 1 being one of hydrogen and a substituted or unsubstituted alkyl, n in Chemical Formula 1 being an integer of 1 to 5, when n is 2 or more the respective $R_3$'s are the same or different from each other, and m in Chemical Formula 1 being 0 or 1;

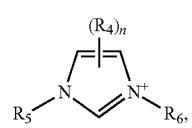

Chemical Formula 2

$R_5$ and $R_6$ in Chemical Formula 2 being independently one of a substituted or unsubstituted alkyl and a substituted or unsubstituted alkoxy, and R₄ in Chemical Formula 2 being one of hydrogen and a substituted or unsubstituted alkyl, n in Chemical Formula 2 being an integer of 1 to 3, and when n is 2 or more the respective R₄'s are the same or different from each other;

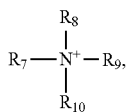

Chemical Formula 3

$R_7$, $R_8$, $R_9$, and $R_{10}$ in Chemical Formula 3 being independently one of a substituted or unsubstituted alkyl and a substituted or unsubstituted alkoxy.

7. The flame retardant electrolyte solution of claim 1, the ionic liquid further comprising one of $N(SO_2CH_3)_2^-$, $N(SO_2CF_2CF_3)_2^{31}$, $PF_6^- BF_4^{31}$ and one or more anions represented by one of Chemical Formula 4 and Chemical Formula 5:

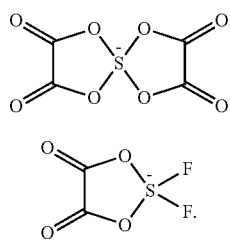

Chemical Formula 4

Chemical Formula 5

8. The flame retardant electrolyte solution of claim 1, the ionic liquid including ammonium cations being included in an amount of about 20 to about 70 wt % based on the total weight of the flame retardant electrolyte solution for a rechargeable lithium battery.

9. The flame retardant electrolyte solution of claim 1, the fluorine-substituted carbonate-based solvent comprising one of fluoroethylene carbonate, difluoroethylene carbonate, fluorodimethyl carbonate, fluoroethylmethyl carbonate and combinations thereof.

10. The flame retardant electrolyte solution of claim 1, the fluorine-substituted carbonate-based solvent being included in an amount of about 5 to about 80 parts based on 100 parts by weight of the flame retardant electrolyte solution for a rechargeable lithium battery.

11. The flame retardant electrolyte solution of claim 1, the flame retardant electrolyte solution for a rechargeable lithium battery having a viscosity of about 1 to about 5 cP.

12. A rechargeable lithium battery comprising:
a positive electrode;
a negative electrode;
a separator; and
a flame retardant electrolyte solution according to claim 1.

13. A flame retardant electrolyte solution for a rechargeable lithium battery consisting essentially of:
a lithium salt;
a carbonate-based solvent consisting of at least one linear carbonate-based solvent;
a fluorine-substituted carbonate-based solvent comprising at least one of a cyclic fluorine-substituted carbonate-based solvent and a linear fluorine-substituted carbonate-based solvent;
an ionic liquid including ammonium cations; and
a phosphazene solvent, the phosphazene solvent comprising a phosphazene compound,
the solvent including a phosphate compound, a phosphonate compound, and a phosphazene compound,
the phosphazene solvent being included in an amount of about 5 wt % to about 30 wt % based on the total weight of the flame retardant electrolyte solution for a rechargeable lithium battery,
the phosphate compound comprising one of trimethyl phosphate (TMP), triethyl phosphate (TEP), tripropyl phosphate (TPP), triphenyl phosphate (TPP), tricresyl phosphate (TCP), trixylene phosphate (TXP) and halogen-substituted compounds of any of the above,
the phosphonate compound comprising one of an alkyl phosphonate compound and a halogen-substituted alkyl phosphonate compound, and
the phosphazene compound comprising one of hexamethoxycyclotriphosphazene and fluorinated cyclotriphosphazene.

14. The flame retardant electrolyte solution of claim 1, the flame retardant electrolyte solution further comprising one of a phosphate compound, a phosphonate compound, and combinations thereof.

15. The flame retardant electrolyte solution of claim 1, the flame retardant electrolyte solution further comprising a trialkyl phosphate.

16. The flame retardant electrolyte solution of claim 1, the flame retardant electrolyte solution further comprising trimethyl phosphate.

* * * * *